US011289216B2

(12) United States Patent
Markham et al.

(10) Patent No.: US 11,289,216 B2
(45) Date of Patent: Mar. 29, 2022

(54) NUCLEAR REACTOR CORE SHROUD SECURING DEVICE

(71) Applicant: Framatome Inc., Lynchburg, VA (US)

(72) Inventors: Kenneth Wade Markham, Forest, VA (US); David John Peckham, Madison Heights, VA (US)

(73) Assignee: Framatome Inc., Lynchburg, VA (US)

( * ) Notice: Subject to any disclaimer, the term of this patent is extended or adjusted under 35 U.S.C. 154(b) by 401 days.

(21) Appl. No.: 16/414,233

(22) Filed: May 16, 2019

(65) Prior Publication Data
US 2020/0365286 A1    Nov. 19, 2020

(51) Int. Cl.
| | | |
|---|---|---|
| *G21C 13/024* | (2006.01) | |
| *G21C 13/02* | (2006.01) | |
| *G21C 13/028* | (2006.01) | |
| *G21C 13/032* | (2006.01) | |
| *G21C 15/10* | (2006.01) | |
| *G21C 19/20* | (2006.01) | |

(52) U.S. Cl.
CPC ........... *G21C 13/024* (2013.01); *G21C 13/02* (2013.01); *G21C 13/028* (2013.01); *G21C 15/10* (2013.01); *G21C 19/207* (2013.01); *G21C 13/032* (2013.01)

(58) Field of Classification Search
CPC ...... G21C 13/024; G21C 13/02; G21C 13/06; G21C 13/028; G21C 13/032; G21C 19/207; G21C 15/10; G21C 5/10; G21C 17/01; G21C 17/003; G21C 1/084; B25B 29/02; B25B 13/481; B25B 23/10; B25B 27/16; B25B 27/023
See application file for complete search history.

(56) References Cited

U.S. PATENT DOCUMENTS

| | | | | |
|---|---|---|---|---|
| 2,983,659 A | * | 5/1961 | Treshow | G21C 1/08 |
| | | | | 376/272 |
| 5,402,570 A | | 4/1995 | Weems et al. | |
| 5,623,525 A | * | 4/1997 | Jensen | G21C 19/207 |
| | | | | 376/260 |

(Continued)

FOREIGN PATENT DOCUMENTS

| | | | |
|---|---|---|---|
| JP | H11125685 A | 5/1999 | |
| JP | 2019002728 A | 1/2019 | |
| WO | WO-2006035168 A1 * | 4/2006 | ............. B25B 23/10 |

OTHER PUBLICATIONS

Search Report and Written Opinion for PCT/US2020/032998, which claims priority of the present application.

*Primary Examiner* — Darlene M Ritchie
(74) *Attorney, Agent, or Firm* — Davidson, Davidson & Kappel, LLC

(57) ABSTRACT

A securing device is installable on an outer circumferential surface of a nuclear reactor core shroud and in contact with an inner circumferential surface of a pressure vessel. The securing device includes a base configured for contacting the outer circumferential surface of the nuclear reactor core shroud. The securing device also includes a radial extender including an actuator, a stationary support section fixed to the base and a movable contact section. The radial extender is configured such that the movable contact section is movable along the stationary support section by the actuator to force the movable contact section radially into the inner circumferential surface of the pressure vessel.

14 Claims, 7 Drawing Sheets

(56) References Cited

U.S. PATENT DOCUMENTS

| | | | |
|---|---|---|---|
| 5,646,969 A * | 7/1997 | Jensen | G21C 19/207 |
| | | | 376/260 |
| 5,809,100 A | 9/1998 | Butler | |
| 8,077,824 B2 * | 12/2011 | Fortier | G21C 5/10 |
| | | | 376/461 |
| 10,760,603 B2 * | 9/2020 | Welsh | F16B 5/0635 |
| 2013/0243144 A1 * | 9/2013 | Villagomez | G21C 17/007 |
| | | | 376/249 |
| 2018/0328393 A1 * | 11/2018 | Welsh | F16B 2/245 |

* cited by examiner

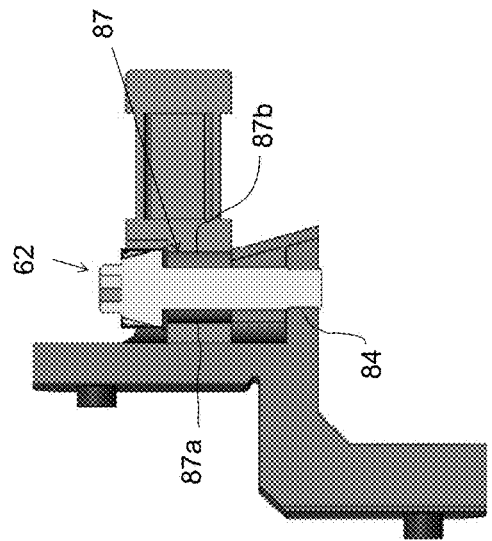
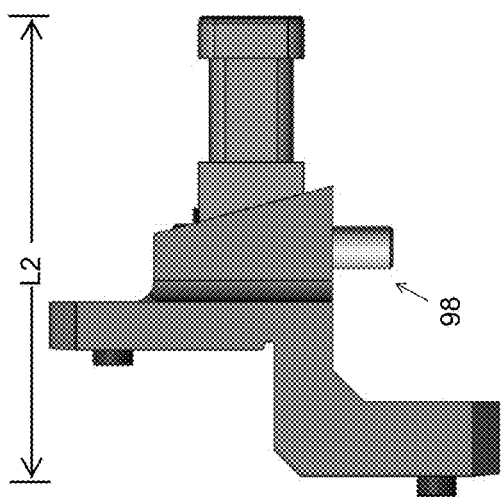
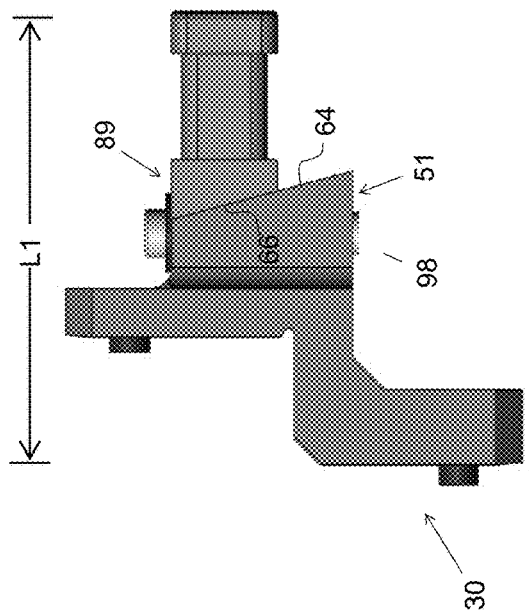
Fig. 7a   Fig. 7b   Fig. 7c   Fig. 7d

NUCLEAR REACTOR CORE SHROUD SECURING DEVICE

The present disclosure relates generally to nuclear reactors and more specifically to devices for securing core shrouds in nuclear reactors.

BACKGROUND

Boiling water reactors have a core shroud that holds the fuel in proper alignment with the control rod drives so that the plant can shut down safely. The core shroud has circumferential welds that hold cylinders of the shroud together to maintain alignment. Some of these circumferential welds have indications which require some type of repair to allow continued safe operation.

U.S. Pat. No. 5,402,570 discloses a method for repairing boiling water reactor shrouds using a plurality of tie rods that apply vertical compressive forces to the shrouds. U.S. Pat. No. 5,809,100 discloses a method and tool for measuring a preload on tie rods applying forces to nuclear reactor core shrouds.

FIG. 1 shows a perspective view of a shroud comprising a larger shroud cylinder 114 positioned above a smaller shroud cylinder 112. The shroud further includes a disc section (middle ring) connecting the larger shroud cylinder 114 to the smaller shroud cylinder 112 through two circumferential welding conventionally named H2 and H3 welds. FIG. 1 furthermore shows a plurality of blocks 110 that are bolted across the H2 and H3 welds to secure the smaller shroud cylinder 112 and the larger shroud cylinder 114 to each other. These repairs include (i) a multitude—e.g., approximately twelve, of these blocks (ii) with bolts 116 fixing blocks 110 to cylinders 112, 114 passing entirely through cylinders 112, 114. Both features (i) and (ii) are needed to achieve the axially and radially support for the shroud cylinders in operation.

SUMMARY OF THE INVENTION

A securing device is provided for installing on an outer circumferential surface of a nuclear reactor core shroud and in contact with an inner circumferential surface of a pressure vessel. The securing device includes a base configured for contacting the outer circumferential surface of the nuclear reactor core shroud. The securing device also includes a radial extender including an actuator, a stationary support section fixed to the base and a movable contact section. The radial extender is configured such that the movable contact section is movable along the stationary support section by the actuator to force the movable contact section radially into the inner circumferential surface of the pressure vessel.

A method for installing a securing device on an outer circumferential surface of a nuclear reactor core shroud and in contact with an inner circumferential surface of a pressure vessel is provided. The method includes fixing a base of the securing device to outer circumferential surface of the nuclear reactor core shroud; and moving an actuator of the securing device to force a movable contact section of the securing device along a stationary support section of the securing device to force the movable contact section radially into the inner circumferential surface of the pressure vessel.

BRIEF DESCRIPTION OF THE DRAWINGS

The present invention is described below by reference to the following drawings, in which:

FIGS. 7a to 7d illustrate how the actuator is moved axially to vary the radial extent of the securing device.

DETAILED DESCRIPTION

One problem with conventional techniques is that they are very expensive to implement, due to excessive time required for installation and the expense of the hardware to be fabricated for the repair. Another problem with the conventional technique represented in FIG. 1 is that the through holes in the shroud cylinders impact the tightness of the shroud and the bolts emerging inside the shroud cylinders impact the fluid flow inside of shroud cylinders.

The present disclosure provides a securing device with lateral support to reduce the quantity of repairs needed to provide the securing device for safe operation. The securing device of the present disclosure utilizes underwater threading of a blind hole to allow the bases of the securing device to be bolted directly to the core shroud without making a through hole, reducing the bypass fluid flow inside the core shroud that is associated with repairs that go entirely through the wall of the shroud.

Figure 1:
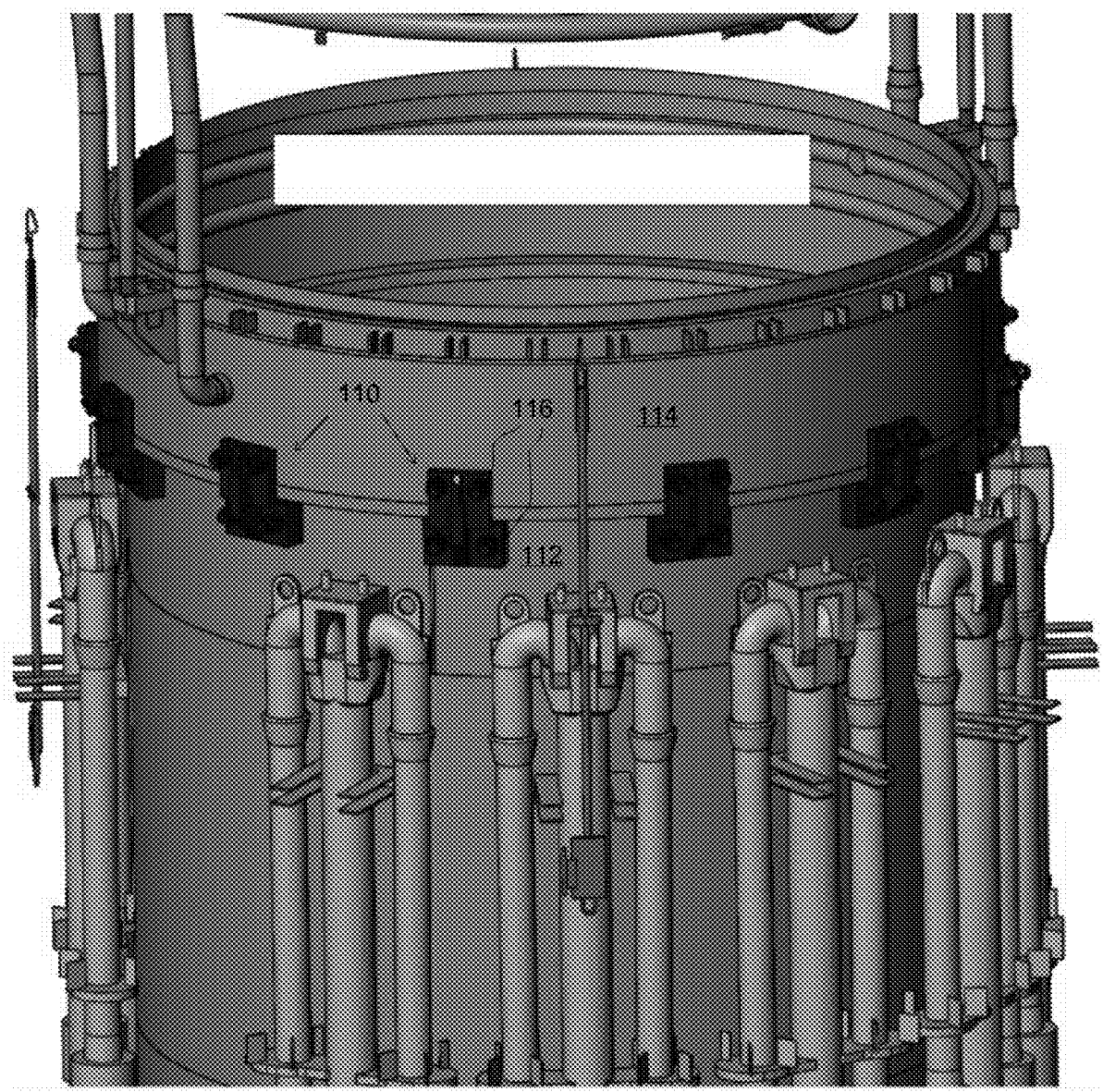
FIG. 1 shows a perspective view of a conventional arrangement for securing sections of a nuclear reactor core shroud with respect to each other.

Advantages of the securing device of the present disclosure may be as follows:

providing axial and radial support for welds on the core shroud with a minimal number of securing devices installed (potentially only four securing devices of the present disclosure circumferentially spaced at 90 degree increments, compared with approximately twelve as shown in FIG. 1);

attaching the securing devices of the present disclosure to the shroud does not increase bypass fluid flow within the shroud; and the tapered wedge design of the securing devices of the present disclosure allows the lateral support of the securing device to be adjusted during installation for optimal fit with respect to the pressure vessel, allowing for thermal expansion during operation (belleville washers may be utilized to allow compliance on the lateral supports).

Figure 2:
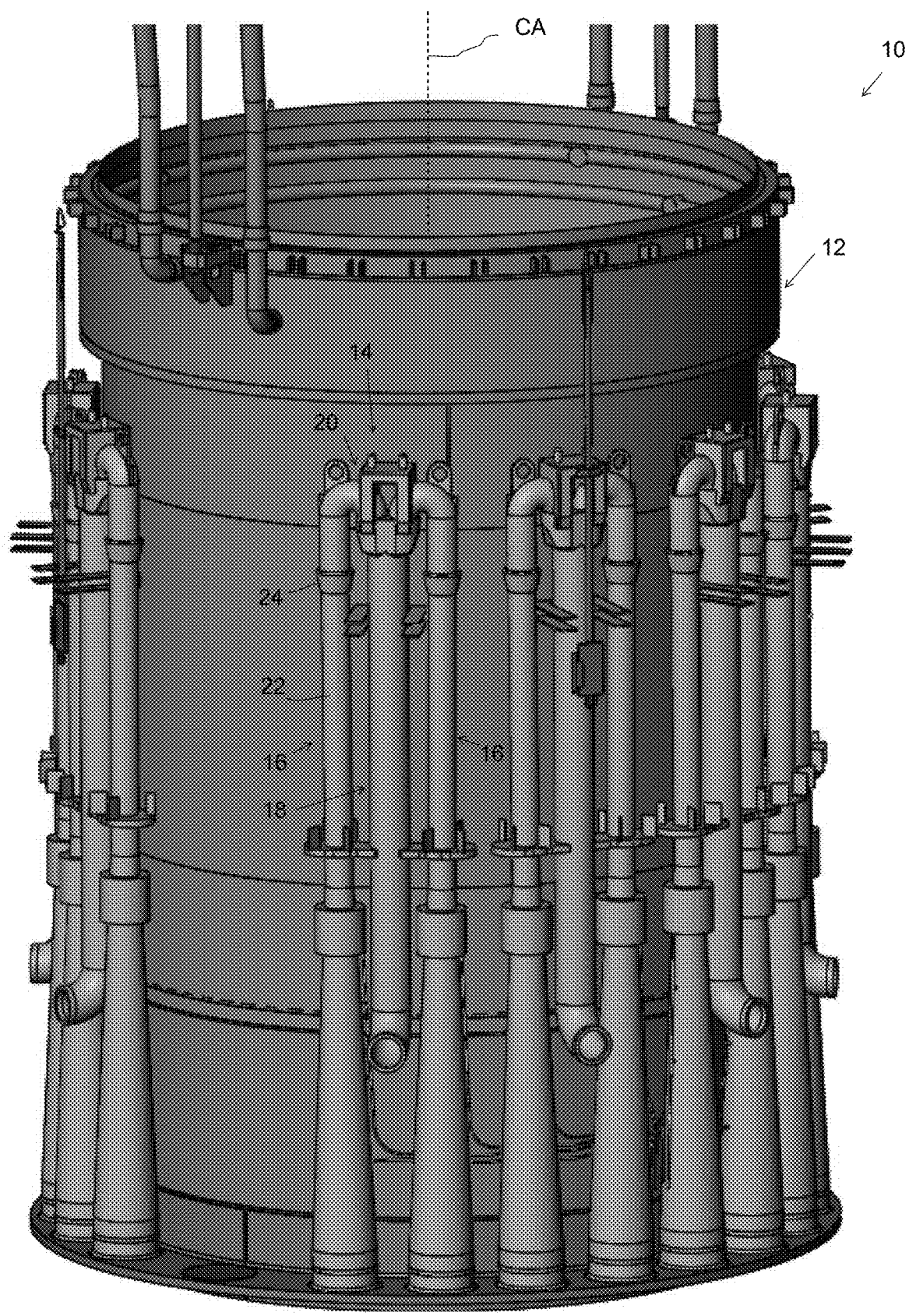
FIG. 2 shows a nuclear reactor core shroud assembly.

FIG. 2 schematically shows a nuclear reactor core shroud assembly 10 that is surrounded by a nuclear reactor pressure vessel in a nuclear reactor. Shroud assembly 10 is centered on a vertically extending longitudinal center axis CA. As used herein, the terms circumferential, radial, axial and derivatives thereof are defined with respect to center axis, unless otherwise specified. Shroud assembly 10 includes a shroud 12 that surrounds nuclear fuel assemblies and is surrounded by a plurality of jet pump assemblies 14 that are provided in an annular space, known as a downcomer annular, radially between shroud 12 and the pressure vessel. Each jet pump assembly 14 includes two jet pumps 16 that are coupled to a riser pipe 18 by a ram's head 20. Water enters riser pipe 18, passes through ram's head 20 and is then driven downward into an inlet mixer 22 by drive nozzles 24.

Figure 3:
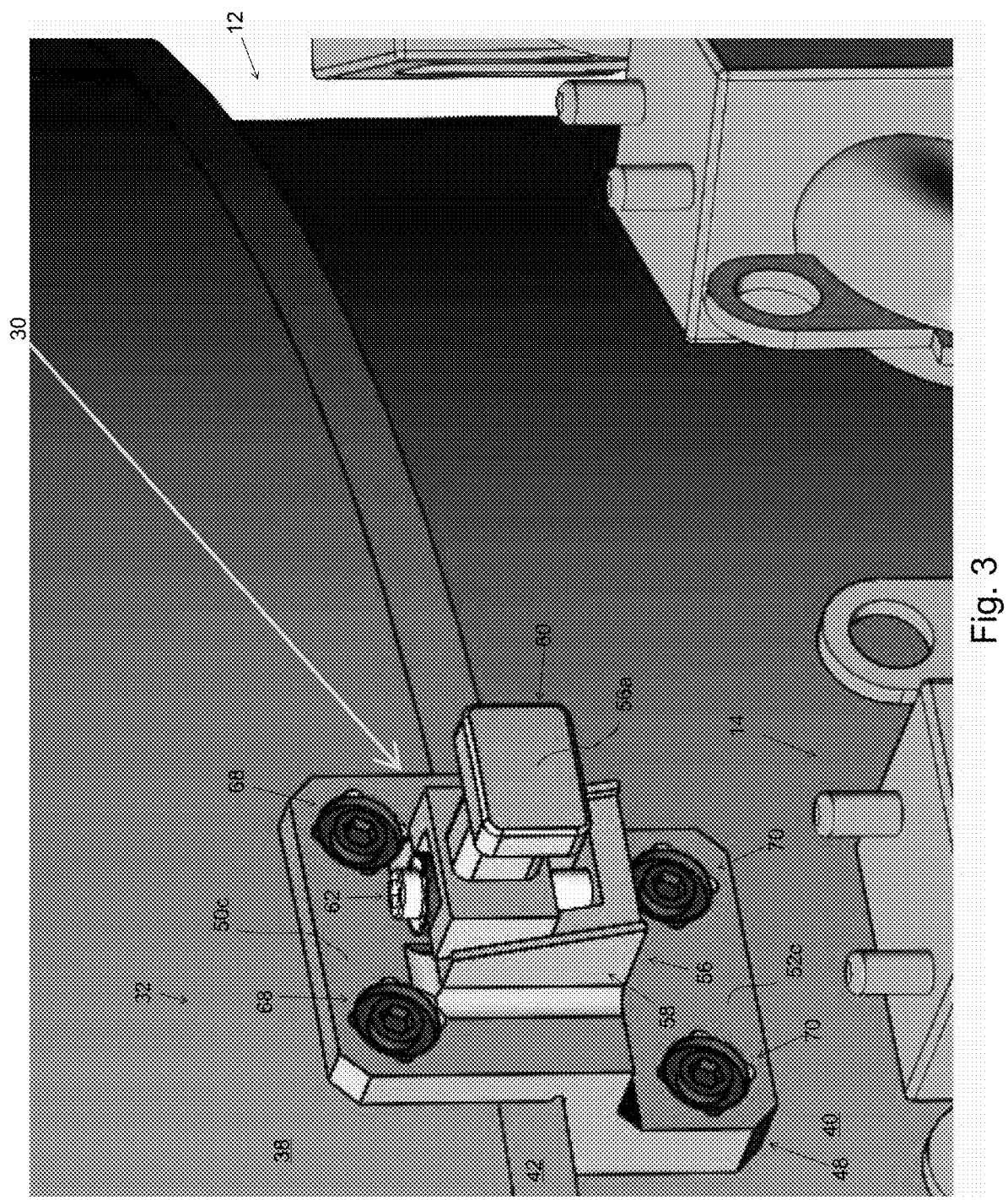
FIGS. 3 and 4 show perspective views of a securing device in accordance with an embodiment of the present invention installed on an outer circumferential surface of a shroud.
Figure 4:
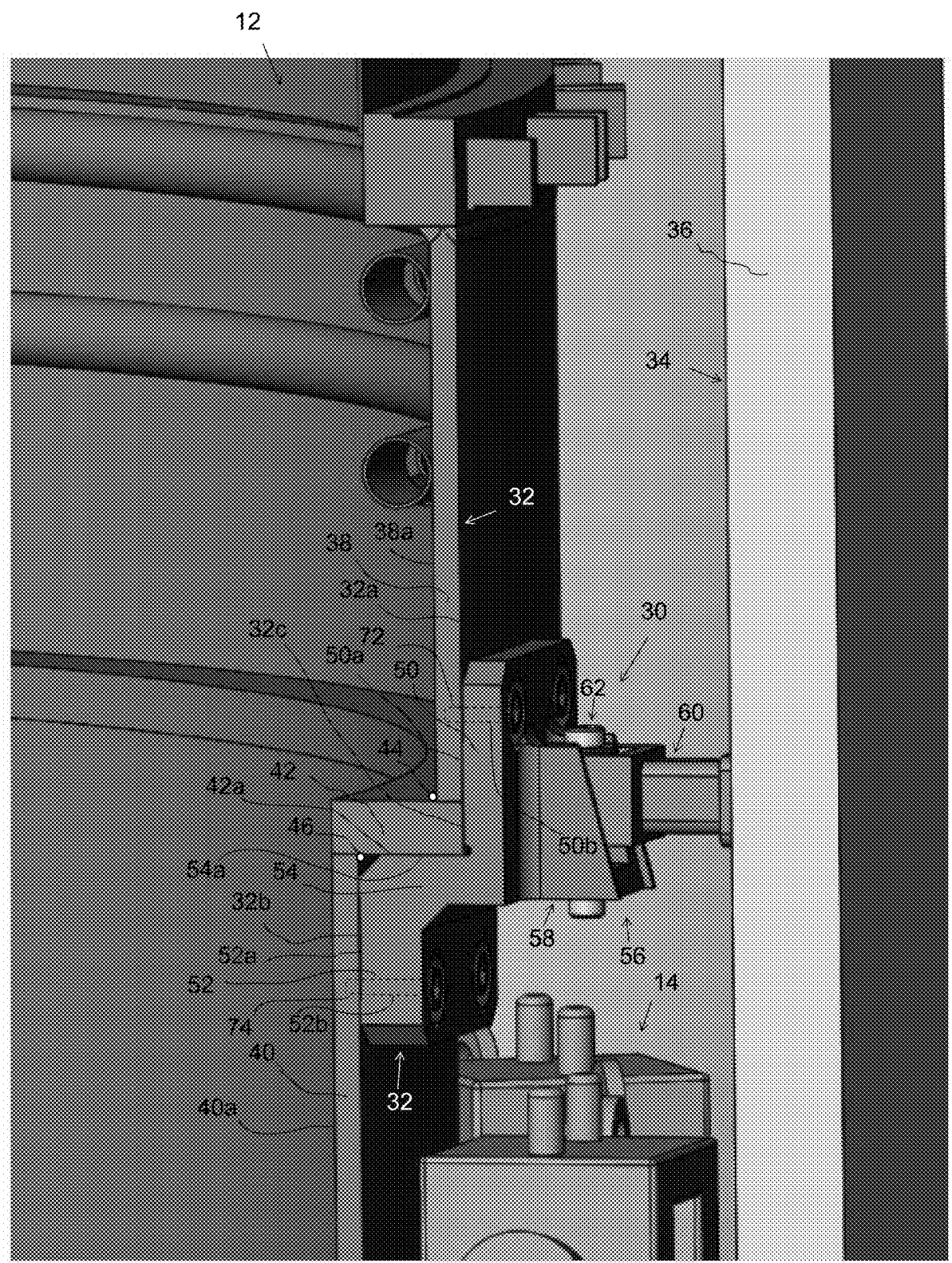

FIGS. 3 and 4 show perspective views of a securing device 30 in accordance with an embodiment of the present invention installed on an outer circumferential surface 32 of shroud 12 above jet pump assemblies 14. FIG. 4 shows how securing device 30 is wedged radially between outer circumferential surface 32 of shroud 12 and an inner circumferential surface 34 of pressure vessel 36.

As shown in FIGS. 3 and 4, shroud 12 includes a first cylindrical section 38 and a second cylindrical section 40 having an outer diameter that is less than first cylindrical section 38. First cylindrical section 38 is positioned above second cylindrical section 40. Shroud 12 further includes a disc section 42 connecting first cylindrical section 38 to second cylindrical section 40. Disc section 42 extends radially inward from first cylindrical section 38 to second cylindrical section 40. Sections 38, 40, 42 together define outer circumferential surface 32 of shroud 12, with section 38 defining a first outer circumferential surface section 32a, section 40 defining a second outer circumferential surface section 32b, and disc section 42 defining a third outer circumferential surface section 32c. Sections 38, 42 have the same outer diameter, which is greater than the outer diameter of section 40.

Disc section 42 is fixed to first cylindrical section 38 by a first weld 44—known as the H2 weld—and is fixed to second cylindrical section 40 by a second weld 46—known as the H3 weld. Over time, welds 44, 46 have indications which require some type of repair to allow continued safe operation of shroud 12. Securing devices 30 are applied to shroud 12 to radially secure sections 38, 40, 42 with respect to each other to allowed continued operation of shroud 12.

As shown in FIGS. 3 and 4, securing device 30 includes a stepped base 48 that is configured for contacting outer circumferential surface 32 of shroud 12. Base 48 includes a first radial contact section 50 having a contact surface 50a configured for radially contacting first outer circumferential surface section 32a and for radially contacting third outer circumferential surface section 32c. Base 48 also includes a second radial contact section 52, which is radially offset from first radial contact section 50, having a contact surface 52a configured for radially contacting second outer circumferential surface section 32b. Base 48 further includes an axial contact section 54, which connects radial contact sections 50, 52, having a contact surface 54a configured for axially contacting a lower radially extending surface 42a of disc section 42.

Figure 5:
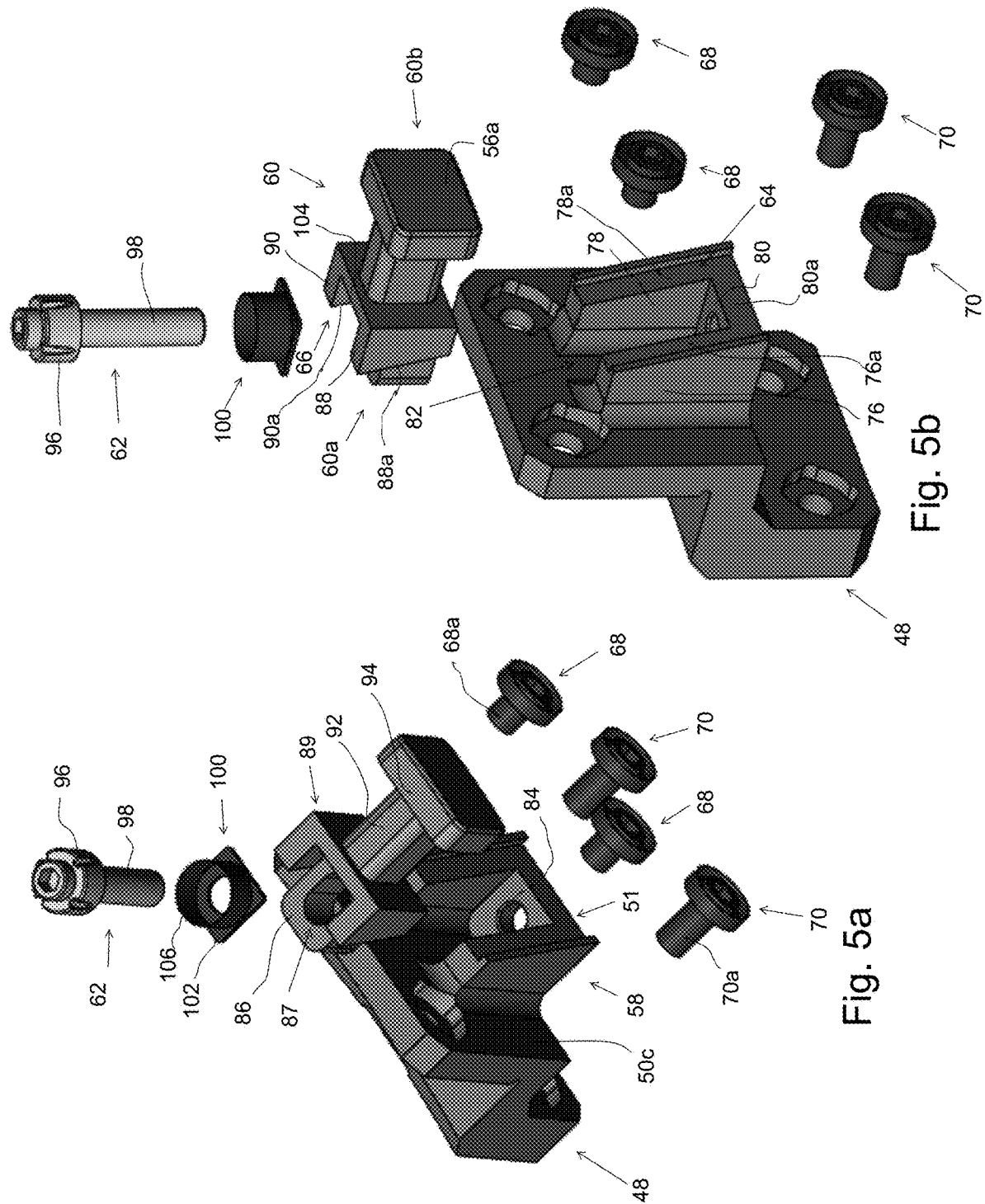
FIGS. 5a, 5b show exploded views of the securing device shown in FIGS. 3 and 4.

Securing device 30 further includes a radial extender 56 configured for pressing against inner circumferential surface 34 of pressure vessel 36 to wedge securing device 30 radially between outer circumferential surface 32 of shroud 12 and inner circumferential surface 34 of pressure vessel 36. Radial extender 56 includes a first portion in the form of a stationary support portion 58 rigidly fixed to base 48 and a second portion in the form of a movable contact portion 60 that is radially movable with respect to base 48 by an actuator 62 of radial extender 56. As described further below, stationary support portion 58 includes a sloped surface 64 (FIGS. 5a, 5b) and movable contact portion 60 includes a sloped surface 66 (FIGS. 5a, 5b). Portions 58, 60 are configured such that axial movement of movable contact portion 60 by actuator 62 moves movable contact portion 58 radially with respect to base 48 and stationary support portion 58. The axial movement of movable contact portion 60 varies a radial distance between contact surface 50a of base 48 and a contact surface 56a of radial extender 56.

Base 48 includes a plurality of holes 50b, 52b passing radially therethrough. More specifically, first radial contact section 50 includes two holes 50b passing radially therethrough and second radial contact section 52 includes two holes 52b passing radially therethrough. Holes 50b pass from contact surface 50a to an outer surface 50c of first radial contact section 50 and holes 52b pass from contact surface 52a to an outer surface 52c of second radial contact section 50. Each of holes 50b, 52b receives a respective fastener 68, 70, which in a preferred embodiment are bolts, for mounting securing device 30 on shroud 12. Each of fasteners 68, 70 includes a respective threaded shank 68a, 70a (FIGS. 5a, 5b) that extends through the respective hole 50b, 52b into a respective one of a plurality of threaded blind holes 72, 74 formed in shroud 12 such that the threads of shanks 68a, 68b and holes 72, 74 intermesh to fix securing device 30 to shroud 12. In particular, first cylindrical section 38 includes two threaded holes 72 formed therein extending from outer circumferential surface section 32a into first cylindrical section 38, without breaching an inner circumferential surface 38a of section 38, and second cylindrical section 40 includes two threaded holes 74 formed therein extending from outer circumferential surface section 32b into second cylindrical section 40, without breaching an inner circumferential surface 40a of section 40.

FIGS. 5a, 5b show exploded views of securing device 30. As shown in FIGS. 5a, 5b, base 48 is formed integrally as a single piece with stationary support portion 58. Stationary support portion 58 protrudes radially from outer surface 50c of first radial contact section 50 and forms a first wedge part 51 including three walls 76, 78, 80 extending from outer surface 50c that define a receptacle 82 configured for receiving a first end 60a of movable contact portion 60. First and second walls 76, 78 define identical side walls of support portion 58 and third wall 80 defines a bottom wall. Third wall 80 includes a threaded axially extending hole 84 passing entirely therethrough axially and configured for receiving a portion of actuator 62. Walls 76, 78 each have a tapered irregular prism shape such that walls 76, 78 become progressively larger in the radial direction as walls 76, 78 extend downward toward bottom wall 80. Walls 76, 78, 80 together form sloped surface 64 of support portion 58. In particular, each of walls 76, 78 includes a respective sloped surface section 76a, 78a that extends further away from first radial contact section 50 as surface sections 76a, 78a extend downward. In the embodiment shown in FIGS. 5a, 5b, wall 80 also includes a sloped surface section 80a that is coincident and coextensive with surface sections 76a, 78a; however, in other embodiments surface section 80a may have a different shape.

Movable contact portion 60 includes a first end 60a for moving axially and vertically within receptacle 82 and a second end 60b configured for contacting inner circumferential surface 34 of pressure vessel 36 via contact surface 56a. First end 60a includes an insertion section 86 that is axially slidable within receptacle 82 between side walls 76, 78 and toward and away from bottom wall 80. Insertion section 86 includes a radially elongated slot 87 passing axially therethrough that is configured for receiving actuator 62. Insertion section 86 is connected to a second wedge part 89 and laterally between side walls 88, 90 of second wedge part 89 that form sloped surface 66. Walls 88, 90 each include a sloped surface section 88a, 90a forming sloped surface 66. Walls 88, 90 are shaped such that sloped surface 66 has a complementary shape to sloped surface 64, causing sloped surface 64 to rest flush against sloped surface 66 while movable contact portion 60 is being moved axially and radially by actuator 62. Contact portion 60 further includes an arm 92 extending radially from wedge part 89 to a stop 94, which is provided on second end 60b, that includes contact surface 56a, which defines a radial outermost surface of securing device 30.

Actuator 62 is formed as a bolt including a head 96 and a threaded shank 98. Actuator 62 is centered on insertion section 86 between walls 88, 90 by a washer 100. Washer 100 includes a square base 102 configured for sliding in contact with lateral surfaces of walls 88, 90 as actuator 62 is moved between radial ends of elongated slot 87. Actuator 62 is axially movable in elongated slot 87 due to a radial length of slot 87 being greater than a diameter of shank 98. Base 102 contacts a radially inner surface of an outer wall 104 of wedge part 89 when actuator 62 is at a radially outermost position of actuator 62. Outer wall 104 extends laterally between side walls 88, 90. During the axial movement of actuator 62, base 102 moves radially along walls 88, 90 and toward or away from outer wall 104. Washer 100 further includes a cylindrical centering wall 106 extending axially upward from base 102 that is configured for receiving head 96 to align actuator 62.

Figure 6:
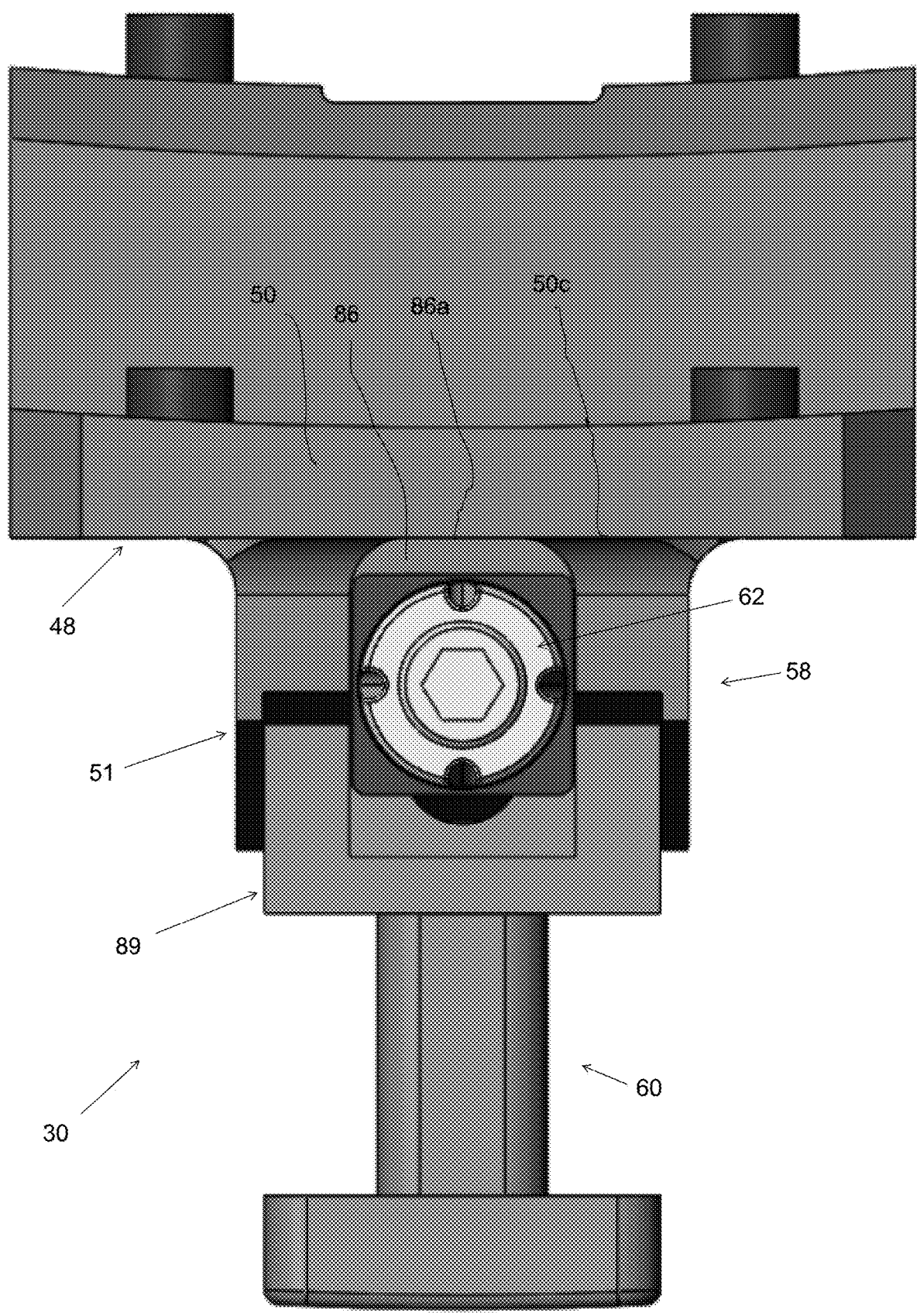
FIG. 6 shows a top plan view of a securing device with stationary and movable portions connected together by an actuator.

FIG. 6 shows a top plan view of securing device 30 with portions 58, 60 connected together by actuator 62. In the view in FIG. 6, actuator 62 is at a radially innermost position of actuator 62, such that a radially innermost contact surface 86a of insertion section 86 contacts outer surface 50c of first radial contact section 50. As shown in the view in FIG. 6, wedge part 89 radially overlaps wedge part 51.

FIGS. 7a to 7d illustrate how the actuator 62 is moved axially within hole 84 and radially in elongated slot 87 to vary the radial extent of securing device 30. FIGS. 7a and 7b illustrate actuator 62 in a first position in which securing device 30 is in a radially contracted position, with FIG. 7a showing a side view of securing device 30 and FIG. 7b showing a cross-sectional side view of securing device 30. In the position shown in FIGS. 7a, 7b, second wedge part 89 is positioned at a top of wedge part 51 and actuator 62 is positioned such that a bottom of shank 98 is in hole 84 and a top of shank 98 is positioned in elongated hole 87 spaced away from both a radially inner edge 87a and a radially outer edge 87b of elongated hole 87.

FIGS. 7c and 7d illustrate actuator 62 in a second position in which securing device 30 is in a radially extended position, with FIG. 7c showing a side view of securing device 30 and FIG. 7d showing a cross-sectional side view of securing device 30. In the position shown in FIGS. 7c, 7d, second wedge part 89 is positioned near a bottom of wedge part 51 and actuator 62 is positioned such that a bottom of shank 98 is below hole 84 and a top of shank 98 is positioned in elongated hole 87 in contact with radially inner edge 87a.

In order to move from the position in FIGS. 7a, 7b, where securing device 30 has a minimum radial length L1, to the position in FIGS. 7c, 7d, where securing device 30 has a maximum radial length L2, actuator 62 is rotated such that shank 98 moves axially downward in hole 84 via the engagement of the helical threads of shank 98 and the helical threads of hole 84. As actuator 62 is moved axially downward, sloped surface 66 of movable contact portion 60 slides along sloped surface 64 of stationary support portion 58, causing movable contact portion 60 to move radially outward away from base 48. The movement of movable contact portion 60 radially outward away from base 48 allows contact surface 56a of stop 94 to press against inner circumferential surface 34 of pressure vessel 36, forcing contact surface 50a of first radial contact section 50 radially against first outer circumferential surface section 32a of shroud 12 and forcing contact surface 52a of second radial contact section 52 radially against second outer circumferential surface section 32b of shroud 12.

A method of installing securing device 30 on shroud 12 first includes machining threaded holes 72, 74 in shroud 12. Then, the method includes aligning holes 50b, 52b of base 48 with the respective holes 72, 74 in shroud and installing fasteners 68, 70 through the respective holes 50b, 52b and into the respective holes 72, 74 such that base 48 is fixed to shroud 12. Next, actuator 62 is actuated axially downward such that sloped surface 66 of movable contact portion 60 moves along sloped surface 64 of stationary support portion 58 and movable contact portion 60 is forced radially outward against inner circumferential surface 34 of pressure vessel 36. A plurality of securing devices 30 are circumferentially spaced from each other on shroud 12 to support the alignment of sections 38, 40, 42 of shroud 12 with respect to each other and with respect to the vessel 36.

A thermal expansion of shroud 12 and pressure vessel 36 may be compensated with a series of Belleville washers that can either be below movable contact portion 60 or above movable contact portion 60 on actuator 62. The location of the washers can be determined as the thermal analysis is completed to see the differential growth characteristics.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense. In particular, in BWR reactors shroud, any linking two shroud cylinders assembled through disc section and welding lines can be secured by using the security device and the method of the present invention.

What is claimed is:

1. A securing device for installation on an outer circumferential surface of a nuclear reactor core shroud and in contact with an inner circumferential surface of a nuclear reactor pressure vessel, the securing device comprising:
   a base configured for contacting the outer circumferential surface of the nuclear reactor core shroud; and
   a radial extender including an actuator, a stationary support section fixed to the base and a movable contact section, the radial extender being configured such that the movable contact section is movable along the stationary support section by the actuator to force the movable contact section radially into the inner circumferential surface of the pressure vessel,
   wherein the radial extender is configured such that an axial movement of the actuator moves the movable contact section radially,
   wherein the movable contact section includes an elongated hole formed therein, the actuator being radially movable in the elongated hole as the actuator moves the movable contact section radially.

2. The securing device as recited in claim 1 further comprising a plurality of fasteners for passing through the base into the nuclear reactor core shroud.

3. The securing device as recited in claim 1 wherein the stationary support section includes an axially extending hole formed therein, the actuator being movable in the axially extending hole to move the movable contact section radially.

4. The securing device as recited in claim 1 wherein the actuator is a bolt extending through the movable contact section and through the stationary support section.

5. The securing device as recited in claim 1 wherein the base includes a first radial contact section having a contact surface configured for radially contacting a first outer circumferential surface section of the nuclear reactor core shroud and a second radial contact section having a contact surface configured for radially contacting a second outer circumferential surface section of the nuclear reactor core shroud, the first radial contact section being radially offset from the second radial contact section.

6. The securing device as recited in claim 1 wherein the stationary support section and the movable contact section are connected together by the actuator.

7. The securing device as recited in claim 1 wherein the stationary support section includes a first wedge part and the movable contact section includes a second wedge part, the first wedge part being slidable along the second wedge part by the actuator to force the movable contact section radially into the inner circumferential surface of the pressure vessel.

8. The securing device as recited in claim 7 wherein the first wedge part includes a first sloped surface and the second wedge part includes a second sloped surface that is complementary to the first sloped surface.

9. A method for installing a securing device on an outer circumferential surface of a nuclear reactor core shroud and in contact with an inner circumferential surface of a pressure vessel, the method comprising:
    fixing a base of the securing device to outer circumferential surface of the nuclear reactor core shroud; and
    moving an actuator of the securing device to force a movable contact section of the securing device along a stationary support section of the securing device to force the movable contact section radially into the inner circumferential surface of the pressure vessel,
    wherein the movable contact section includes an elongated hole therein, the moving of the actuator including moving the actuator radially within the elongated hole.

10. The method as recited in claim 9 wherein the fixing of the base to the outer circumferential surface of the nuclear reactor core shroud includes machining blind holes into the shroud and installing fasteners through the base and into the blind holes.

11. The method as recited in claim 9 wherein the stationary support section includes a first wedge part and the movable contact section includes a second wedge part, the moving of the actuator including sliding the second wedge part along the first wedge part via the actuator.

12. The method as recited in claim 9 wherein the stationary support section includes an axially extending hole, the moving of the actuator including moving the actuator axially within the axially extending hole.

13. A securing device for installation on an outer circumferential surface of a nuclear reactor core shroud and in contact with an inner circumferential surface of a nuclear reactor pressure vessel, the securing device comprising:
    a base configured for contacting the outer circumferential surface of the nuclear reactor core shroud; and
    a radial extender including an actuator, a stationary support section fixed to the base and a movable contact section, the radial extender being configured such that the movable contact section is movable along the stationary support section by the actuator to force the movable contact section radially into the inner circumferential surface of the pressure vessel,
    wherein the stationary support section includes a first wedge part and the movable contact section includes a second wedge part, the first wedge part being slidable along the second wedge part by the actuator to force the movable contact section radially into the inner circumferential surface of the pressure vessel.

14. The securing device as recited in claim 13 wherein the first wedge part includes a first sloped surface and the second wedge part includes a second sloped surface that is complementary to the first sloped surface.

* * * * *